United States Patent [19]
Erickson

[11] 3,906,809
[45] Sept. 23, 1975

[54] TRANSMISSION HAVING AN INFINITELY VARIABLE DRIVE RATIO

[76] Inventor: Marlo W. V. Erickson, 2703 E. Copper, Apt. C, Tucson, Ariz. 85716

[22] Filed: Mar. 11, 1974

[21] Appl. No.: 449,740

[52] U.S. Cl. ............... 74/217 S; 74/192; 74/217 C
[51] Int. Cl.² .................. F16H 09/00; F16H 15/16
[58] Field of Search .......... 74/217 S, 217 C, 217 R, 74/191, 192

[56] References Cited
UNITED STATES PATENTS

| | | | |
|---|---|---|---|
| 1,160,414 | 11/1915 | Kelsey | 74/217 C |
| 3,165,002 | 1/1965 | Hatch | 74/217 R |

FOREIGN PATENTS OR APPLICATIONS

| | | | |
|---|---|---|---|
| 887,551 | 11/1943 | France | 74/217 R |

Primary Examiner—Leonard H. Gerin
Attorney, Agent, or Firm—Cahill, Sutton & Thomas

[57] ABSTRACT

A variable ratio transmission having a pair of oppositely oriented adjacent splined cone shaped members interconnected by a selectively positionable positive gripping drive chain is disclosed.

7 Claims, 3 Drawing Figures

TRANSMISSION HAVING AN INFINITELY VARIABLE DRIVE RATIO

The present invention relates to transmissions, and, more particularly, to transmissions having an infinitely variable gear ratio.

Variable ratio transmissions have been under development for a period of years. An early U.S. Pat. No. 657,516, discloses a variable gear ratio transmission for motor vehicles which incorporates a pair of oppositely oriented cone shaped pulleys. These pulleys are interconnected by means of a positionable belt. The position of the belt along the longitudinal axis of the cones determines the relative rate of rotation between the driving and the driven pulley. The effectiveness of the power transmitting capability of this transmission is dependent upon the friction between the belt and the pulleys. In a relatively recent U.S. Pat. No. 3,394,602, certain improvements were made in the positioning mechanism for a friction drive belt, but the basic problems inherent with any friction dependent transmission still prevailed.

Concurrently, various cone shaped variable ratio transmissions were developed which employed an intermediate friction dependent member to transmit the power from one pulley to another. U.S. Pat. Nos. 1,637,664, 2,424,837 and 3,043,149, are representative of this technological trend.

In an effort to avoid the problems inherent with friction drive systems, a ring gear was disposed about each of a pair of cone shaped pulleys, which gears meshed with one another (see U.S Pat. No. 2,432,442). The gear ratio was varied by repositioning the ring gears as a unit along the axis of the pulleys. However, the driving force intermediate each pulley and its circumscribing ring gear was dependent upon the friction therebetween. Thus, the ultimate power transmitting capability still remained friction dependent.

Additional United States Patents which are directed to variable ratio transmissions incorporating one or more cone shaped members include the following: U.S. Pat. No. 390,216 and 2,807,171.

It is therefore a primary object of the present invention to provide a non-slipping infinitely variable gear ratio transmission.

Another object of the present invention is to provide a transmission having a selectively variable gear ratio.

Yet another object of the present invention is to provide a positive gripping drive chain, which chain can accommodate varying diameters of the driving and driven cone shaped members.

Still another object of the present invention is to provide a drive chain which positively interconnects splined cone shaped members.

A further object of the present invention is to provide a pair of oppositely oriented cone shaped members having constant width splines interconnected by a flexible drive chain.

A yet further object of the present invention is to provide a drive chain conformable to the varying diameter of each of a pair of cone shaped members having constant width longitudinally oriented splines.

These and other objects of the present invention will become apparent to those skilled in the art as the description thereof proceeds.

The present invention may be described with greater specificity and more clarity with reference to the following figures, in which.

As pointed out above, cones, oriented parallel and opposite to one another and interconnected with a drive belt, have been used to obtain variable gear ratio transmissions. With such a transmission, the circumferential distance about one of the cones is either greater or lesser than that of the adjacent cone at a point falling within the plane normal to the axis of the cones. The belt, when repositioned in the longitudinal axis of the cones, provides a selectable gear ratio within certain parameters. Thus, it is possible to obtain an infinite variety of gear ratios rather than certain predetermined gear ratios.

As will be described more fully below, the present invention also incorporates the basic teaching of two oppositely oriented cone shaped members interconnected by a drive chain. However, the present invention is not dependent upon high friction to overcome slippage intermediate the input shaft and the output shaft. The power transmitting capability is dependent solely upon the strength of the elements themselves.

Figure 1:
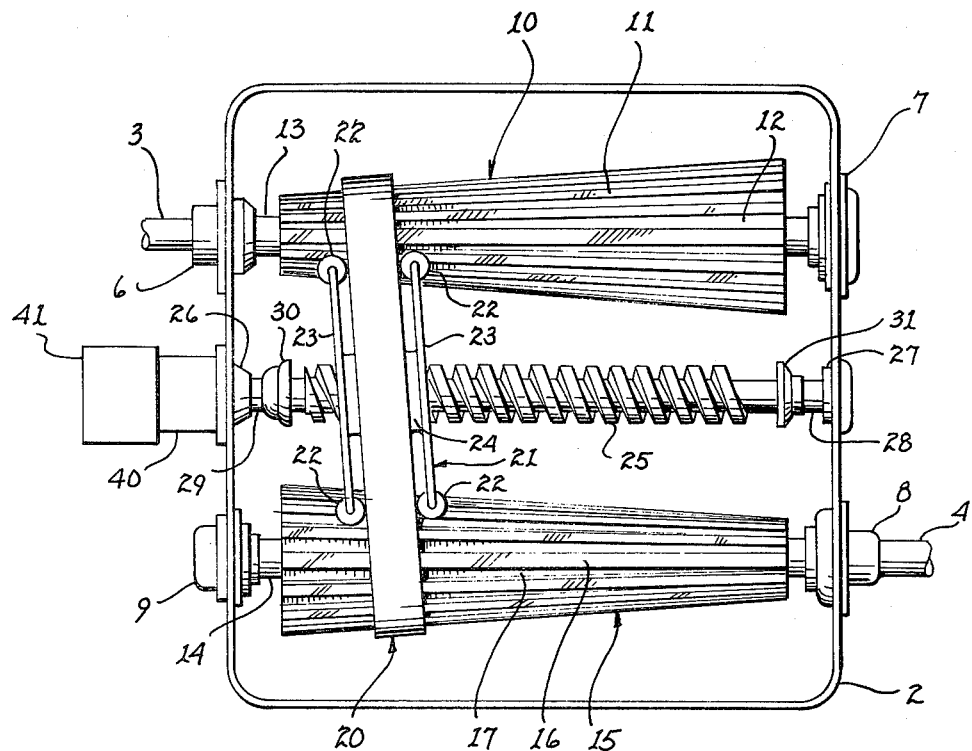
FIG. 1 illustrates the basic elements of the present invention.

Referring to FIG. 1, there is shown a transmission 1 enclosed within a case 2 intermediate an input shaft 3 and an output shaft 4. A tapered gear 10 is mounted upon a shaft 13, which shaft may be an extension of input shaft 3 or directly connected thereto. Shaft 13 is supported within case 2 by means of bearings disposed within bearing boxes 6 and 7. Similarly, tapered gear 15 is mounted upon shaft 14, which may be an extension of output shaft 4 or directly connected thereto. Shaft 14 is supported within case 2 by means of bearings disposed within bearing boxes 8 and 9.

A plurality of constant width splines 11 are longitudinally disposed upon the surface of tapered gear 10. As the circumference of the tapered gear decreases as its diameter decreases, the spacing 12 intermediate adjacent splines 11 is proportionally reduced to accommodate the constant width splines. Similarly, a plurality of constant width splines 16 are longitudinally disposed about the surface of tapered gear 15. The width of the spacing 17 intermediate adjacent splines 16 decreases from the large diameter end to the small diameter end to accommodate the decreasing circumferential distance.

A drive chain 20 extends about and interconnects the two tapered gears 10 and 15. The construction of the drive chain 20 will be described with greater specificity with reference to FIGS. 2 and 3 below.

A worm gear 25 includes shafts 28 and 29 extending outwardly therefrom. These shafts may be attached to worm gear 25 or formed as a part thereof. Shafts 28 and 29 are supported within case 2 by means of bearings disposed within bearing boxes 26 and 27. A drive chain guide 21 includes a follower assembly 24 mating with worm gear 25. Rotation of worm gear 25 will result in a proportional displacement of chain guide 21 along the axis of the worm gear due to the action of follower 25. In addition, a pair of arms 23 extend outwardly from follower assembly 24 and include rollers 22 or similar guide means disposed at the arm extremities. The width between arms 23 and adjacent rollers 22 is equivalent to the width of drive chain 20 such that the position of chain guide 21 along the longitudinal axis of worm gear 25 is determinative of the point of engagement between drive chain 20 and tapered gears 10 and 15. It may therefore be understood that rotation of worm gear 25 will result in a proportional repositioning of drive chain 20 along the longitudinal axis of tapered gears 10 and 15.

A reversible electric motor 40 and a motor control unit 41 are secured to case 2. Control means are disposed within control box 41 to actuate motor 40 as well as to determine the direction of rotation of the motor. Actuation of motor 40 results in rotational movement of worm gear 25 to reposition chain guide 21.

Movement of follower 24 upon worm gear 25 is limited by a pair of stops 30 and 31 disposed upon shafts 29 and 28, respectively. Stops 30 and 31 may be used to trip the worm actuating mechanism or other wise limit further movement of the follower 24.

Figure 2:
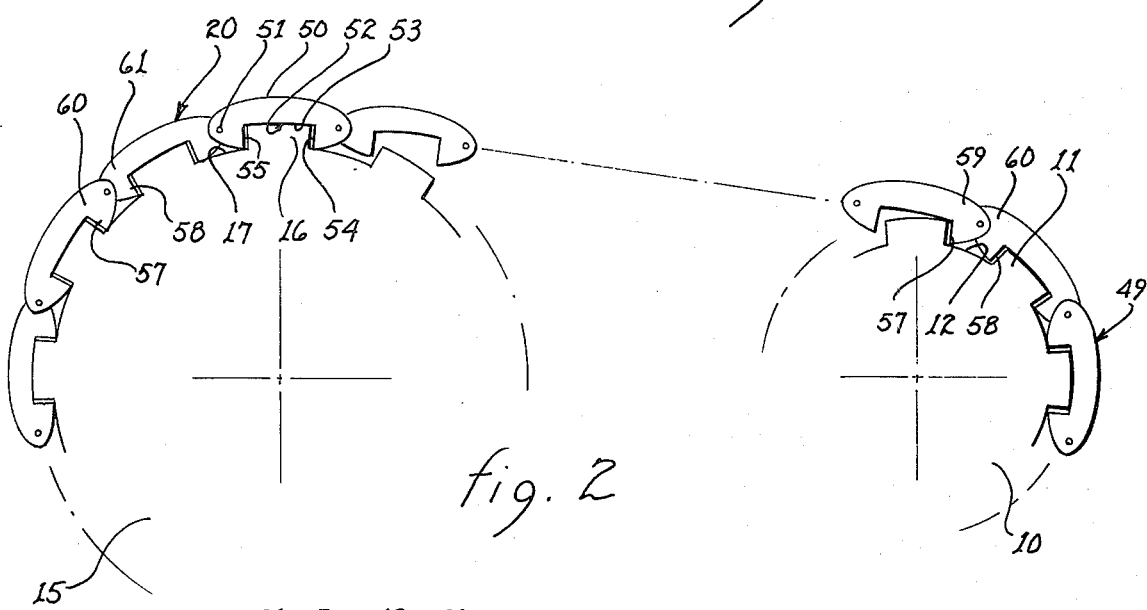
FIG. 2 illustrates a side view of the conformability of the drive chain to variable diameter driving and driven members.
Figure 3:
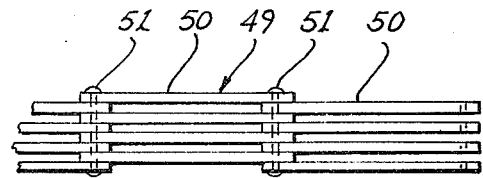
FIG. 3 illustrates a top view of the chain links forming the chain, as shown in FIG. 2.

The constructional features of drive chain 20 will be described with joint reference to FIGS. 2 and 3. The drive chain is formed of a plurality of chain links 50. These links are stacked in tiers 49 with the chain links of one tier being interleaved with the chain links of an adjacent tier. The tiers of chain links are joined to one another by pins or rivets 51 whereby one tier of links is pivotable with respect to an adjacent tier of links.

Each of chain links 50 includes a gripping means, which may be C shaped and have a recess 52 defined by base 53 and sides 54 and 55. The width and depth of recess 52 is commensurate with the width and height of splines 11 and 16 of tapered gears 10 and 15, respectively. Thereby, little play if any will exist between each link and the engaged spline.

As mentioned above, the width and height of splines 11 and 16 are constant while the width of spacings 12 and 17 decrease towards the tapered end of the respective tapered gears. In the presentation shown in FIG. 2, one section of chain link 50 extends about a large diameter section of tapered gear 15 while another section of the chain link extends about a smaller diameter section of tapered gear 10. To accommodate the difference in curvature of the two tapered gears, adjacent tiers 49 of the chain link 50 will pivot about their respective rivets 51. The pivotal movement of one chain link 50 with respect to an adjacent pivotally connected chain link will cause point 57 of ear shaped end 60 to be positioned closer to point 58 of ear shaped end 61. It has been learned that the reduced spacing between points 57 and 58 caused by pivotal movement of adjacent tiers of chain links is approximately equivalent to the reduced spacing intermediate the splines as the diameter of the tapered gear is reduced. It may therefore be understood by those skilled in the art that the drive chain 20 of the present invention automatically accommodates for the varying spacing intermediate the splines of the tapered gears.

From the above description it will become readily apparent that the drive chain 20 and tapered gears 10 and 15 of the present invention provides a positive no-slip interconnection between the input shaft 3 and the output shaft 4 while affording the capability for varying the gear ratio therebetween.

Few details have been given with regard to the control mechanisms disposed within control box 41 as the particular application of the present invention will be determinative of the type and nature of control mechanism to be employed. In example, a mechanical interconnection may be effected between the position of the throttle for an internal combustion engine, or electric motor, which position generates a command to electric motor 40 to reposition the drive chain guide 21. Alternatively, a power demand system operable at any speed may be incorporated within control box 41 to vary the gear ratio in accordance with the demanded power output. Limit switches or speed governors may also be appended to either the input or output shaft to restrict the total movement or the rate of movement of chain guide 21.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. A variable gear ratio transmission for transmitting torque and having an input shaft and an output shaft; said transmission comprising in combination:
   a. a first tapered gear connected to the input shaft, said first gear having a plurality of constant width longitudinally oriented splines;
   b. a second tapered gear connected to the output shaft, said second gear having a plurality of constant width longitudinally oriented splines, said second gear being mounted with its axis parallel to and in alignment with the axis of said first gear, said first and second gears having the adjacent portions of their surfaces parallel to one another in the plane containing the axis of said first and second gears;
   c. a drive chain interconnecting said first and second gears, said drive chain including a plurality of pivotal chain links to accommodate the varying circumference of said first and second gears;
   d. gripping means disposed within said drive chain for gripping said splines of said first and second gears, said gripping means alternately engaging and disengaging said splines of said first and second gears as said drive chain travels about said first and second gears; and
   e. guide means for positioning said drive chain along the axis of said first and second gears; whereby, said gripping means positively engages said splines of said first and second gears to establish a gear ratio commensurate with the position of said guide means.

2. A variable gear ratio transmission for transmitting torque and having an input shaft and an output shaft; said transmission comprising in combination:
   a. a first tapered gear connected to the input shaft, said first gear having a plurality of constant width longitudinally oriented splines;
   b. a second tapered gear connected to the output shaft, said second gear having a plurality of constant width longitudinally oriented splines, said second gear being mounted with its axis parallel to the axis of said first gear, said first and second gears having the adjacent portions of their surfaces parallel to one another in the plane containing the axis of said first and second gears;

c. a drive chain interconnecting said first and second gears, said drive chain including a plurality of pivotable chain links to accommodate the varying circumference of said first and second gears;

d. gripping means disposed within said drive chain for gripping said splines of said first and second gears; and e. guide means for positioning said drive chain along the axis of said first and second gears, said guide means comprising:
  i. a rotatable worm gear;
  ii. a follower assembly engaging said worm gear, said follower assembly being translatable along the axis of said worm gear in response to rotation of said worm gear; and
  iii. arms extending from said follower for guiding said drive chain commensurate with movement of said follower assembly;

whereby, said gripping means positively engages said splines of said first and second gears to establish a gear ratio commensurate with the position of said guide means.

3. The transmission as set forth in claim 2 including motor means for rotating said worm gear.

4. The transmission as set forth in claim 3 further including control means for selectively actuating said motor means.

5. The transmission as set forth in claim 1 wherein said splines of said first and second gears are of constant width and height.

6. A variable gear ratio transmission for transmitting torque and having an input shaft and an output shaft; said transmission comprising in combination:

a. a first tapered gear connected to the input shaft, said first gear having a plurality of longitudinally oriented splines of constant width and height;

b. a second tapered gear connected to the output shaft, said second gear having a plurality of longitudinally oriented splines of constant width and height, said second gear being mounted with its axis parallel to the axis of said first gear, said first and second gears having the adjacent portions of their surfaces parallel to one another in the plane containing the axis of said first and second gears;

c. a drive chain interconnecting said first and second gears, said drive chain including a plurality of pivotable chain links to accommodate the varying circumference of said first and second gears;

d. gripping means disposed within said drive chain for gripping said splines of said first and second gears, said gripping means comprising a chain link having a recess disposed therein, said recess being equivalent in width and depth to the width and height of said splines, respectively; and e. guide means for positioning said drive chain along the axis of said first and second gears; whereby, said gripping means positively engages said splines of said first and second gears to establish a gear ratio commensurate with the position of said guide means.

7. The transmission as set forth in claim 6 wherein said drive chain includes a plurality of tiers of aligned ones of said chain links, each said tier being pivotally connected to an adjacent tier to form an endless chain.

* * * * *